United States Patent [19]

Boroschewski et al.

[11] 3,879,441
[45] Apr. 22, 1975

[54] (N,N-DIMETHYL-N-[3-METHYLMETALOLYLCARBAMYLOXY)-PHENYL]-UREA

[75] Inventors: Gerhard Boroschewski; Frederich Arndt; Reinhard Rusch, all of Berlin, Germany

[73] Assignee: Schering AG, Berlin and Bergkamen, Germany

[22] Filed: July 10, 1970

[21] Appl. No.: 53,988

Related U.S. Application Data

[63] Continuation of Ser. No. 663,938, Aug. 29, 1967, abandoned.

[30] Foreign Application Priority Data

Sept. 5, 1966 Germany.............................. 39491
June 7, 1967 Germany.............................. 40838

[52] U.S. Cl...................... 260/471 C; 71/88; 71/94; 71/95; 71/111; 260/326.3; 260/247.2 A; 260/247.2 B; 260/293.73; 260/293.74
[51] Int. Cl.......................................... C07c 101/18
[58] Field of Search................................ 260/471 C

[56] References Cited
UNITED STATES PATENTS 3,404,975  10/1968  Wilson et al..................... 260/471 C
3,434,822  3/1969  Wilson et al.... 260;71/471 C;120 X

*Primary Examiner*—Alex Mazel
*Assistant Examiner*—Jose Tovar

[57] ABSTRACT

Agents having at least one compound of the general formula

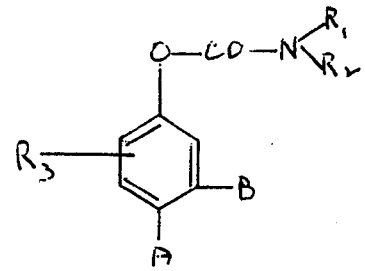

where
$R_1$ is hydrogen or alkyl,
$R_2$, aryl, aralkyl, or cycloakly possibly mono- or poly-substituted by alkyl and/or halogen alkyl and/or alkoxy and/or alkyl mecapto and/or halogen and/or the nitro group,
$R_3$, hydrogen or alkyl,
A and B are different and represent hydrogen or the radical

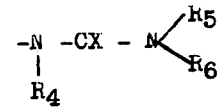

where $R_4$ is hydrogen or alkyl, $R_5$, hydrogen or alkyl, $R_6$, alkyl or alkoxy,
$R_5$ and $R_6$ are jointly with the N atom a heterocyclic ring possibly containing additional N and/or O atoms, and X is oxygen or sulfur and, if B represents hydrogen, $R_2$ may also represent alkyl or alkenyl, possess a herbidical effect and are suitable in particular for weed control in crop cultivations.

1 Claim, No Drawings

(N,N-DIMETHYL-N-[3-METHYLMETALOLYLCARBAMYLOXY)-PHENYL]-UREA

The invention relates to herbicides. It relates in particular to herbicides having a selective herbicidal effect, containing new N-carbamoyloxy-phenylureas.

The herbicidal effect of 3-(N-alkylcarbamoyloxy)-phenylureas, e.g. N,N-dimethyl-N'-(3-(N''-tertiary butylcarbamoyloxy)-phenyl)urea, is discussed in known Belgian Patent No. 661,399. These compounds, however, have no, or only and insufficient selectivity toward useful plants.

It has now been found that agents containing one or more compounds, of the general formula

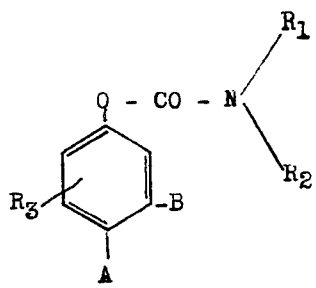

where
$R_1$ is hydrogen or alkyl,
$R_2$, aryl, aralkyl, or cycloakyl possibly mono- or poly-substituted by alkyl and/or halogen alkyl and/or alkoxy and/or alkyl mecapto and/or halogen and/or the nitro group,
$R_3$, hydrogen or alkyl,
A and B are different and represent hydrogen or the radical

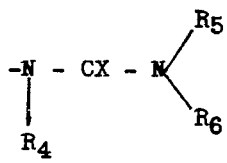

where $R_4$ is hydrogen or alkyl, $R_5$, hydrogen or alkyl, $R_6$, alkyl or alkoxy,
$R_5$ and $R_6$ are jointly with the N atom a heterocyclic ring possibly containing additional N and/or O atoms,
and
X is oxygen or sulfur and, if B represents hydrogen,
$R_2$ may also represent alkyl or alkenyl,
possess a herbicidal effect and are suitable in particular for weed control in crop cultivations.

Thus, with their use, contrary to the above named known active ingredients, delicate dicotyledons, for example, sugar beets and cotton, are surprisingly enough not harmed. This selective effect extends to the use both in the pre-germination process as by spraying on seed, and to the use in the post-germination process, by treatment of the germinated cultures, so that there is present here a true selectivity as to effect. The tolerance of the crop plants toward the agents to be used according to this invention is considerable, as even major quantities up to 5 kg of active ingredient per hectare cause no damage to the crops.

Considerable technical progress is therefore connected with the use of the herbicides according to the invention, since because of the great selectivity of these herbicides a reliable control of weeds in beet and cotton cultivations without damage to these crops, is rendered possible.

It is obvious that the herbicides according to the invention are suitable not only for selective weed control, but they also can be used in adequate dosages for the destruction of any undesirable plant growth.

As active ingredients; suitable for the above indicated purposes compounds within the above stated general formula and sharing the following characteristics: $R_2$ is phenyl, 2-,3-,4-tolyl, 2,3-dimethylphenyl, 2,4-dimethylphenyl, 2-,3-,4-chlorophenyl, 4-fluorphenyl, 4-bromophenyl, 4-iodophenyl, 3,4-dichlorophenyl, 2,5-dichlorophenyl, 3-chloro-4-methylphenyl, 3-trifluoromethylphenyl, 4-nitrophenyl, 4-methoxyphenyl, 4-methylmercaptophenyl, alpha-naphthyl, benzyl, 4-chlorobenzyl, alkyl radicals with up to 10 carbon atoms, as methyl, ethyl, alkyl, propyl, isopropyl, etc., cycloalkyl, radicals, such as cyclohexyl and others; $R_1$, $R_3$, $R_4$ and $R_5$ are each in itself, hydrogen or low alkyl, as methyl or ethyl or ethyl, and others; $R_6$ is a low alkyl or low alkoxy, as methyl, ethyl, methoxy or ethoxy and others; $R_5$ and $R_6$ jointly with the N atom are the morpholino, piperidino, or pyrrolidino group and others, and X is oxygen or sulfur.

Examples of compounds usable according to the invention are the following (Fp. means melting point):

| Name of Compound | Physical constant |
|---|---|
| N,N-dimethyl-N'-(3-(N''-(3'-methylphenyl)-carbamoyloxy)-phenyl)-phenyl) urea | Fp. = 174 175,5°C |
| N,N-dimethyl-N'-methyl-N'-(3'-(N''-(3''-methylphenyl)-carbamoyloxy)-phenyl)-urea | Fp. = 96 – 97°C |
| N-methyl-N'-(3-(N''-(3'-methylphenyl)-carbamoyloxy)-phenyl)-urea | Fp. = 151 – 152°C |
| N-ethyl-N'-(3-(N''-ethyl-N''-(2'-methylphenyl)-carbamoyloxy)-phenyl)-urea | Fp. = 129 – 130°C |
| N,N-dimethyl-N'-methyl-N'-(3-(N''-(4'-methylphenyl)-carbamoyloxy)-phenyl)-urea | Fp. = 154 – 155°C |
| N,N-dimethyl-N'-methyl-N'-(3-(N''-(3'-methylphenyl)-carbamoyloxy)-phenyl)-urea | Fp. = 96 – 97°C |
| N-ethyl-N'-(3-(N''-ethyl-N''-(2'-methylphenyl)-carbamoyloxy)-phenyl)-urea | Fp. = 129 – 130°C |
| N-methyl-N'-(3-(N''-methyl-N''-(3'-methylphenyl)-carbamoyloxy)-phenyl)-thiourea | resinified |
| N,N-tetramethylen-N'-(3(N''-ethyl-N''-(2'-methylphenyl)-carbamoyloxy)-phenyl)-urea | Fp. = 162 – 163°C |
| N,N-tetramethylen-N'-(3-(N''-ethyl-N'-(3'-methylphenyl)-carbamoyloxy)-phenyl)urea | Fp. = 162,5 – 163,5°C |
| N-methyl-N'-(3-(N''-(4'-methylphenyl)-carbamoyloxy)-phenyl)-urea | Fp. = 167 – 168°C |

– Continued

| Name of Compound | Physical constant |
|---|---|
| N-methyl-N'-(3-(N''-(3'-methylphenyl)-carbamoyloxy)-phenyl)-thiourea | Fp. = 126 – 127°C |
| N-methyl-N'-(3-(N''-ethyl-N''-(2'-methylphenyl)-carbamoyloxyphenyl)-thiourea | resinified |
| N,N-tetramethylen-N'-(3-(N''-(3'-methylphenyl)-carbamoyloxy)-phenyl)-urea | Fp. = 163 – 164° C |
| N,N-tetramethylen-N'-(3-(N''-phenyl)-carbamoyloxy)-phenyl)-urea | Fp. = 167 – 171°C |
| N-methyl-N'-(3-(N''-phenylcarbamoyloxy)-phenyl)-thiourea | Fp. = 142 – 144°C |
| N-ethyl-N'-(3-(N''-(3'-methylphenyl)-carbamoyloxy)-phenyl)-urea | Fp. = 137 – 138°C |
| N-ethyl-N'-(3-(N''-(2'-methylphenyl)-carbamoyloxy)-phenyl)-urea | Fp. = 120 – 121°C |
| N,N-dimethyl-N'-(N''-(3'-trifluoromethylphenyl)-carbamoyloxy)-phenyl)-urea | Fp. = 158 – 159°C |
| N,N-dimethyl-N'-(3-(N''-(3'-nitrophenyl)-carbamoyloxy)-phenyl)-urea | Fp. = 156°C |
| N,N-dimethyl-N'-(3-(N''-(4'-chlorophenyl)-carbamoyloxy)-phenyl)-urea | Fp. = 156,5 – 158°C |
| N,N-dimethyl-N'-(3'-(N''-(4'-bromophenyl)-carbamoyloxy)-phenyl)-urea | Fp. = 162 – 163°C |
| N,N-dimethyl-N'-(3-(N''-(4'-iodophenyl)-carbamoyloxy)-phenyl)-urea | Fp. = 169 – 171°C |
| N,N-dimethyl-N'-(3-(N''-(3'-chlorophenyl)-carbamoyloxy)-phenyl)-urea | Fp. = 164 – 166°C |
| N,N-dimethyl-N'-(3-(N''-(4'-methylphenyl)-carbamoyloxy)-phenyl)-urea | Fp. = 166 – 167°C |
| Morpholine-N-carboxylic acid-3-(N'-phenyl-carbamoyloxy)-anilid | Fp. = 177 – 177,5°C |
| N,N-dimethyl-N'-(N''-methyl-N''-(3'-methylphenyl)-carbamoyloxy)-phenyl)-urea | Fp. = 126°C |
| N-methyl-N'-methyl-N'-(3-(N''-methyl-N''-phenyl-carbamoyloxy)-phenyl)-urea | Fp. = 87 – 88°C |
| N-methyl-N'-methyl-N'-(3-(N''-ethyl-N''-(2'-methylphenyl)-carbamoyloxy)-phenyl)-urea | Fp. = 111 – 112° C |
| N-methyl-N'-methyl-N'-(3-(N''-ethyl-N''-(3'-methylphenyl)-carbamoyloxy)-phenyl)-urea | Fp. = 119 – 120°C |
| N-ethyl-N'-(3-(N''-ethyl-N''-(4'-methylphenyl)-carbamoyloxy)-phenyl)-urea | Fp. = 61 – 62°C |
| N,N-dimethyl-N'-(3-(N''-ethyl-N''-(4'-methylphenyl)-carbamoyloxy)-phenyl)-urea | Fp. = 146 – 147°C |
| N-methyl-N'-(3-(N''-methyl-N''-phenyl-carbamoyloxy)-phenyl)-urea | Fp. = 153 – 154°C |
| N-ethyl-N'-(3-(N''-methyl-N''-phenyl-carbamoyloxy)-phenyl)-urea | Fp. = 138 – 139°C |
| N-methyl-N'-(3-(N''-methyl-N''-(3'-methylphenyl)-carbamoyloxy)-phenyl)-urea | Fp. = 128 – 130°C |
| N-methyl-N'-(3-(N''-ethyl-N''-(2'-methylphenyl)-carbamoyloxy)-phenyl)-urea | Fp. = 151 – 152°C |
| N-methyl-N'-(3-(N''-ethyl-N''-(3'-methylphenyl)-carbamoyloxy)-phenyl)-urea | Fp. = 122 – 123°C |
| N-methyl-N'-(3-(N''-(3'-methylphenyl)-carbamoyloxy)-phenyl)-urea | Fp. = 151 – 152°C |
| N,N-dimethyl-N'-(3-(N''-methyl-N''-(2'-methylphenyl)-carbamoyloxy)-phenyl)-urea | Fp. = 160 – 161°C |
| N,N-dimethyl-N'-(3-(N''-methyl-N''-(4'-methylphenyl)-carbamoyloxy)-phenyl)-urea | Fp. = 102 – 103°C |
| N,N-dimethyl-N'-(3-(N''-methyl-N''-phenylcarbamoyloxy)-phenyl)-urea | Fp. = 138 – 139°C |
| N,N-dimethyl-N'-(3-(N''-ethyl-N''-(3'-methylphenyl)-carbamoyloxy)-phenyl)-urea | Fp. = 113 – 114°C |
| N,N-dimethyl-N'-(3-(N''-(4'-fluorophenyl)-carbamoyloxy)-phenyl)-urea | Fp. = 159 – 160°C |
| N,N-dimethyl-N'-(3-(N''-ethyl-N''-(2'-methylphenyl)-carbamoyloxy)-phenyl)-urea | Fp. = 125 – 126°C |
| N-methyl-N'-methyl-N'-(3-(N'-(3-(N''-(4'-methylphenyl)-carbamoyloxy)-phenyl)-urea | Fp. = 162 – 163°C |
| N-methyl-N'-methyl-N'-(3-(N''-(2'-methylphenyl)-carbamoyloxy)-phenyl)-urea | Fp. = 137 – 138°C |
| N-methyl-N'-methyl-N'-(3-(N''-(3'-methylphenyl)-carbamoyloxy)-phenyl)-urea | Fp. = 117 – 118°C |

| Name of Compound | Physical constant |
|---|---|
| N-ethyl-N'-(3-(N''-ethyl-N''-(2'-methyl-phenyl)-carbamoyloxy)-phenyl)-urea | Fp. = 129 – 130°C |
| N,N-tetramethylene-N'-(3-(N''-ethyl-N''-(2'-methylphenyl)-carbamoyloxy)-phenyl)-urea | Fp. = 162 – 163°C |
| N-ethyl-N'-(3-(N''-ethyl-N''-(3'-methyl-phenyl)-carbamoyloxy)-phenyl)-urea | Fp. = 110 – 111°C |
| N-ethyl-N'-(3-(N''-phenylcarbamoyloxy)-phenyl)-urea | Fp. = 147 – 148°C |
| N-methyl-N'-(3-(N''-phenylcarbamoyloxy)-phenyl)-urea | Fp. = 135 – 136°C |
| N-methyl-N'-(3-(N''-(2'-methylphenyl)-carbamoyloxy)-phenyl)-urea | Fp. = 149 – 150°C |
| N,N-dimethyl-N'-(3-(N''-(2',5'-dichlore-phenyl)-carbamoyloxy)-phenyl)-urea | Fp. = 158 – 159°C |
| N,N-dimethyl-N'-(3-(N''-alpha-naphthyl-carbamoyloxy)-phenyl)-urea | Fp. = 165 – 167°C |
| N,N-dimethyl-N'-(3'-(3'-(N''-(4'-bromo-phenyl)-carbamoyloxy)-phenyl)-urea | Fp. = 162 – 163°C |
| N,N-dimethyl-N'-(3-(N''-(4'-fluoro-phenyl)-carbamoyloxy)-phenyl)-urea | Fp. = 159 – 160°C |
| N,N-dimethyl-N'-(3-(N''-(4'-iodophenyl)-carbamoyloxy)-phenyl)-urea | Fp. = 169 – 170°C |
| N,N-dimethyl-N'-(3-(N''-(2',3'-dimethyl-phenyl)-carbamoyloxy)-phenyl)-urea | Fp. = 159 – 160°C |
| N,N-dimethyl-N'-methyl-N'-(3-(N''-phenyl-carbamoyloxy)-phenyl)-urea | resinified |
| N,N-diathyl-N'-(3-(N''-phenyl-carbamoyloxy)-phenyl)-urea | Fp. = 142 – 144°C |
| N,N-dimethyl-N'-(3-(N''-phenyl-carbamoyloxy)-phenyl)-urea | Fp. = 157 – 159°C |
| N,N-diathyl-N'-(3-(N''-(3'-methylphenyl)-carbamoyloxy)-phenyl)-urea | Fp. = 143 – 145°C |
| N,N-dimethyl-N'-methyl-N'-(3-N''-methyl-N''-phenyl)-carbamoyloxy)-phenyl)-urea | $n_D^{20} = 1,5650$ |
| N,N-dimethyl-N'-methyl-N'-(3-(N''-ethyl-N''-(3'-methyl)-phenyl)-carbamoyloxy)-phenyl)-urea | $n_D^{20} = 1,5547$ |
| N,N-dimethyl-N'-methyl-N'-(3-(N''-ethyl-N''-(2'-methylphenyl)-carbamoyloxy)-phenyl)-urea | $n_D^{20} = 1,5524$ |
| N,N-dimethyl-N'-methyl-N'-(3-N''-methyl-N''-phenylcarbamoyloxy)-phenyl)-urea | $n_D^{20} = 1,5650$ |
| N,N-dimethyl-N'-(4-(N''-phenylcarbamoyloxy)-phenyl)-urea | Fp. = 172 – 174°C |
| N,N-dimethyl-N'-(4-(N''-(3'-methyl-phenyl)-carbamoyloxy)-phenyl)-urea | Fp. = 169 – 171°C |
| N,N-dimethyl-N'-(4-(N''-p-tolyl-carbamoyloxy)-phenyl)-urea | Fp. = 245 – 247°C |
| N,N-dimethyl-N'-(4-(N''-2,3-dimethyl-phenyl)-carbamoyloxy)-phenyl)-urea | Fp. = 160 – 162°C |
| N,N-dimethyl-N'-(4-(N''-ethyl-carbamoyloxy)-phenyl)-urea | Fp. = 144 – 145°C |
| N,N-dimethyl-N'-(4-(N''-propylcarbamoyloxy)-phenyl)-urea | Fp. = 115 – 117°C |
| N,N-dimethyl-N'-(4(N''-allyl-carbamoyloxy)-phenyl)-urea | Fp. = 133 – 137°C |
| N,N-dimethyl-N'-(4-(N''-butylcarbamoyloxy)-phenyl)-urea | Fp. = 130 – 133°C |
| N,N-dimethyl-N'-(4-(N''-isobutylcarbamoyloxy)-phenyl)-urea | Fp. = 118 – 120°C |
| N,N-dimethyl-N'-(4-(N''-tertiary,butylcarbamoyloxy)-phenyl)-urea | Fp. = 146 – 149°C |
| N,N-dimethyl-N'-(4-(N''-dimethylprophyl-carbamoyloxy)-phenyl)-urea | Fp. = 173 – 174°C |
| N,N-dimethyl-N'-(4-(N''-hexylcarbamoyloxy)-phenyl)-urea | Fp. = 123 – 125°C |
| N,N-dimethyl-N'-(4-(N''-octylcarbamoyloxy)-phenyl)-urea | Fp. = 115 – 116°C |
| N,N-dimethyl-N'-(4-(N''-cyclohexyl-carbamoyloxy)-phenyl)-urea | Fp. = 191 – 194°C |
| N,N-dimethyl-N'-(4-(N''-methyl-N''-phenyl-carbamoyloxy)-phenyl)-urea | Fp. = 198 – 199°C |
| N,N-dimethyl-N'-(4-(N''-(4'-chlorophenyl)-carbamoyloxy)-phenyl)-urea | Fp. = 245 – 246°C |
| N-ethyl-N'-(4-(N''-phenylcarbamoyloxy)-phenyl)-urea | Fp. = 221 – 222°C |
| N-ethyl-N'-(4-(N''-(3'-methylphenyl)-carbamoyloxy)-phenyl)-urea | Fp. = 223°C (decomposition) |
| N-methyl-N'-4-(N''-(3'-methylphenyl)-carbamoyloxy)-phenyl)-thiourea | Fp. = 148 – 150°C |
| N-methyl-N'-(4-(N''-(4'-methylphenyl)-carbamoyloxy)-phenyl)-thiourea | Fp. = 173 – 175°C |
| N-ethyl-N'-(4-(N''-methylphenyl)-carbamoyloxy)-phenyl)-urea | Fp. = 227 – 228°C |
| N-ethyl-N'-(4-(N''-tertiary butylcarbamoyloxy)-phenyl)-urea | Fp. = 186°C (decomposition) |
| N,N-dimethyl-N'-(4-(N''-(2,4-dimethylphenyl)-carbamoyloxyphenyl)-urea | Fp. = 143 – 145°C |

The new active ingredients to be used according to the invention may be produced, for example, according to the following illustrative processes:

By reaction of hydroxyphenyl ureas or thioureas of the general formula

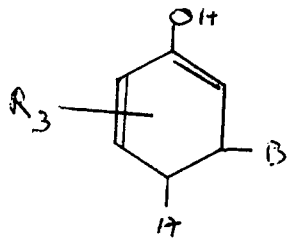

possibly in the form of the alkali, e.g. of the solium or potassium salt, (a) with isocyanates of the general formula $$R_2 - N = C = O$$

advantageously in an organic solvent, as for example, tetrahydrofurane or dimethyl formamide, and possibly with addition of a catalyst, preferably an organic base, as for example, triethylamine, or (b) with carbamoyl chlorides of the general formula

advantageously in an organic solvent, e.g. pyridine, and possibly with addition of an organic or inorganic base, e.g. triethylamine, or (c) with phosgene, advantageously with the use of an organic solvent, e.g. tetrahydrofurane, acetic ester or ethylene chloride, and possibly with addition of an inorganic or organic base, e.g. soda lye or N,N-dimethyl aniline, to the corresponding chloroformic acid ester, which is then reacted with a compound of the general formula

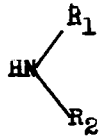

advantageously at temperatures between 5° C and room temperature in water or in an organic solvent, e.g. acetic ester or tetrahydrofurane, if desired with addition of an acid-binding agent, as for example, the above-named bases, or alkali or alkaline earth oxides, hydroxides, or carbonates, $R_1$, $R_2$, $R_3$, A, B, and X having the above mentioned meaning in the stated general formulas.

The following examples illustrate the production of the new active substances, without limitation thereto.

1. Preparation of N,N-dimethyl-N'-(3-(3'-methylphenyl)-carbamoyloxy)-phenyl)-urea 18.0 g (0.1 mole) of N,N-dimethyl-N'-(3-hydroxyphenyl) urea are dissolved in a mixture of 25 ml of dimethyl formamide and 50 ml of tetrahydrofurane and the solution is added with 0.5 ml of triethylamine and 13.3 g(0.1 mole) of 3-methylphenylisocyanate. After 2 hours at room temperature, the solution is added with 400 ml of ether, whereupon the carbamate crystallizes out.
Yield: 26.3 g = 84% of the theory
m.p.: 174° – 175.5° C
N: calculated 13.42% found 13.34%

2. Preparation of N,N-dimethyl-N'-(3-(N''-methyl-N''-(3'-methylphenyl)-carbamoyloxyphenyl)-urea The sodium salt produced from 9.0 g of N,N-dimethyl-N'-(3-hydoxyphenyl)-urea is taken up in 50 ml of acetonitrile. While stirring, 9.2 g of N-methyl-N-(3-methylphenyl)-carbamoylchloride in portions are added at 25° C. Stirring is continued for 30 minutes at 50° C. After cooling to room temperature, the solution is poured into about 20 ml of water, whereupon the carbamate crystallizes out.
Yield: 14.3 g = 87.5% of the theory
m.p.: 126° C

3. Preparation of N,N-dimethyl-N'-(4-(N''-phenylcarbamoyloxy)-phenyl)-urea 12.6 g (0.07 mole) of N,N-dimethyl-N'-4-(hydroxyphenyl)urea are dissolved in 80 ml of tetrahydrofurane and the solution added with 0.5 ml of triethylamine and 8 ml of phenylisocyanate. After several hours at room temperature, the carbamate crystallizes out upon addition of light gasoline.
Yield: 20.9 g = 99.8% of the theory
m.p.: 172° – 174° C

4. Preparation of N,N-dimethyl-N'-(4-(N''-methyl-N''-phenylcarbamoyloxy)-phenyl)-urea The sodium salt produced from 18.0 g (0.1 mole) of N,N-dimethyl-N'-(4-hydroxyphenyl) urea was taken up in 50 ml of acetonitrile. While stirring, a solution of 17.0 g of N-methyl-N-phenylcarbamoyl chloride in 100 ml of acetonitrile was added by drops at 20° to 25° C and subsequently stirring was continued for 30 minutes at 50° C. After filtering and washing with iced water, the product was evaporated under reduced pressure and the residue recrystallized out of acetic acid.
Yield: 23.7 g = 76% of the theory
m.p.: 198° – 199° C The new 3- or 4- hydroxyphenyl ureas needed for the reaction as starting products can be produced for example, by reaction of m- or p-aminophenols with carbamoyl chlorides, isocyanates, mustard oils, or with phosgene or thiophosgene and subsequent reaction with ammonia or amines.

Some starting products are listed in the following table. (Fp. means melting point)

| | |
|---|---|
| N-(3-hydroxyphenyl)-N'-methyl urea | Fp.: 137.5 – 138.5°C |
| N-ethyl-N'-(3-hydroxyphenyl)-urea | Fp.: 135 – 136°C |
| N,N-dimethyl-N'-(3-hydroxyphenyl)-urea | Fp.: 190 – 193°C |
| N,N'-dimethyl-N-(3-hydroxyphenyl)-urea | Fp.: 123 – 124°C |
| N-(3-hydroxyphenyl)-N,N',N'-trimethyl)-urea | Fp.: 105 – 106°C |
| N-(3-hydroxyphenyl)-N,N'-tetramethylene-urea | Fp.: 138 – 139°C |
| Morpholine-N-carboxylic acid-3-hydroxyanilid | Fp.: 180 – 181°C |
| N-(3-hydroxyphenyl)-N'-methylthio-urea | Fp.: 164°C |
| N-ethyl-N'-(4-hydroxyphenyl)-urea | Fp.: 196 – 197°C |
| N-(4-hydroxyphenyl)-N,N',N'-trimethyl-urea | Fp.: 133 – 135°C |
| N,N-dimethyl-N'-(4-hydroxy-2-methyl-phenyl)-urea | Fp.: 225 – 227°C |

The active substances are used, alone or if desired as mixtures, with one another and/or with other herbicides and/or other substances, e.g. fertilizers, namely advantageously in a manner customary for weed control in the form of preparations, as for example, powders, scatter materials, granulates, solutions, emulsions or suspensions, with addition of liquid and/or solid vehicles or diluents and possibly of wetting, adhesion, emulsifying, and/or dispersing aids.

Suitable liquid vehicles are water, mineral oils or other organic solvents, as for example, xylol, cyclohexanol, cyclohexanone, chloroform, carbon tetrachloride, dimethyl formamide, dimethyl sulfoxide, etc. As solid carriers there enter into consideration for example, lime, kaolin, chalk, talcum, attaclay and other clays. As surface-active substances are suitable, among others, salts of the lignin sulfonic acids, salts of alkylated benzenesulfonic acids, sulfonated acid amides and their salts, polyethoxylated amines and alcohols.

The production of the various preparations can be effected in a manner known in the art such as, by grinding or mixing processes.

The herbicidal effect of the agents according to the invention is evident from the following test examples.

EXAMPLE 1

With a quantity used of 5 kg of active ingredient per hectare, suspended in 600 liters of water per hectare, the following selectivity was obtained with sugar beets:

| Active ingredient | Sprayed on seed in pre-germination process | In post-germination process |
|---|---|---|
| N,N-dimethyl-N'-(3-(N''-(3'-methylphenyl)-carbamoyloxy)-phenyl) urea | 100% | 100% |
| N,N-dimethyl-N'-(3-(N''-tert. butylcarbamoyloxy)-phenyl) urea | 0% | 0% |

EXAMPLE 2

In loamy soil, monogram seeds of sugar beets as well as *Stellaria media*, *Galisoga parviflora* and *Senecio vulgaris* were seeded. The active ingredients were sprayed on the seed in a quantity of 5 kg of active ingredient per hectare, suspended in 600 liters of water per hectare. Then the seeds were covered with earth and allowed to germinate. The plants came up after 10 days. Even after 4 weeks, no growth damage was observed on the sugar beets treated with the agents according to the invention, while the weeds were destroyed. The known agent, on the contrary, showed no selectivity for sugar beets.

| Active ingredient | Stellaria media | Galinsoga parviflora | Senecio vulgaris | Sugar beets |
|---|---|---|---|---|
| N,N-dimethyl-N'-(3-(N''-(3'-methylphenyl)-carbamoyloxy)-phenyl) urea | 0 | 0 | 0 | 10 |
| N,N-dimethyl-N'-(3-(N''-tert. butylcarbamoyloxy)-phenyl) urea | 0 | 0 | 0 | 0 |
| Untreated | 10 | 10 | 10 | 10 |

0 = totally destroyed
10 = not damaged

EXAMPLE 3

Sugar beets, *Stellaria media*, *Galinsoga parviflora*, and *Senecio vulgaris* were treated with the agents referred to, after the plants had produced their first foliage leaves and were in the young stage. The quantity used was 5 kg of active substance per hectare, suspended in 600 liters of water per hectare. With this treatment in the post-germination process the agent of the invention destroyed only the weeds, while the sugar beets showed no impairment of the growth even four weeks after the treatment. The known agent, on the contrary, destroyed also the crop plants.

| Active ingredient | Stellaria media | Galinsoga parviflora | Senecio vulgaris | Sugar beets |
|---|---|---|---|---|
| N,N-dimethyl-N'-(3-(N''-(3'-methylphenyl)-carbamoyl-oxy-phenyl) urea | 0 | 0 | 0 | 10 |
| N,N-dimethyl-N'-(3-(N''-tert. butycarbamoyloxy)-phenyl) urea | 0 | 0 | 0 | 0 |
| Untreated | 10 | 10 | 10 | 10 |

0 = totally destroyed
10 = not damaged

EXAMPLE 4

In loamy soil seeds of peas as well as *Stellaria media*, *Galinsoga parviflora*, and *Senecio vulgaris* were seeded. The active ingredients were sprayed in a quantity of 3 kg of active ingredient per hectare, suspended in 600 liters of water per hectare. The plants germinated after about 8 days. Even after four weeks no growth damage was noted on the peas treated with the agent according to the invention. But the weeds were destroyed. The known agent showed no selectivity.

| Active ingredient | Stellaria media | Galinsoga parviflora | Senecio vulgaris | Peas |
|---|---|---|---|---|
| N,N-dimethyl-N'-(3-(N''-methyl-N'''-(3'-methyl-phenyl)-carbamoyloxy)-phenyl) urea F: 126 deg. C | 0 | 0 | 0 | 10 |
| N,N-dimethyl-N'-(3-(N''-tert. butyl-carbamoyl-oxy)-phenyl) urea | 0 | 0 | 0 | 0 |
| Untreated | 10 | 10 | 10 | 10 |

0 = totally destroyed
10 = not damaged

EXAMPLE 5

Peas, *Stellaria media*, *Galinsoga parviflora*, and *Senecio vulgaris* were treated with the agents referred to in the young stage. The quantity used was 3 kg of active ingredient per hectare, suspended in 600 liters of water per hectare. With this treatment the agent of the invention destroyed only the weeds, but not the peas, which four weeks after the treatment still showed no impairment of the growth. The known agent, on the contrary, destroyed also the crop plant.

| Active ingredient | Stellaria media | Galinsoga parviflora | Senecio vulgaris | Peas |
|---|---|---|---|---|
| N,N-dimethyl-N'-(3-(N''-methyl-N'''-(3'-methyl-phenyl)-carbamoyloxy)-phenyl) urea m.p.: 126 deg. C | 0 | 0 | 0 | 10 |
| N,N-dimethyl-N'-(3-(N''-tert. butyl-carbamoyloxy)-phenyl) urea | 0 | 0 | 0 | 0 |
| Untreated | 10 | 10 | 10 | 10 |

0 = totally destroyed
10 = not damaged

EXAMPLE 6

At a quantity used of 5 kg of active ingredient per hectare, suspended in 600 liters of water per hectare, the following selectivity was obtained for sugar beets and cotton.

| Active ingredient | Sprayed on seed in pre-germination process | In post-germination process | |
|---|---|---|---|
| | Sugar beet | Sugar beet | cotton |
| N,N-dimethyl-N'-(4-(N''-phenylcarbamoyloxy)-phenyl) urea | 100% | 100% | 100% |
| N,N-dimethyl-N'-(3-(N''-tert. butylcarbamoyloxy)-phenyl) urea | 0% | 0% | 0% |

EXAMPLE 7

In loamy soil seeds of sugar beet (*Beta vulgaris*) as well as of *Sinapis ssp.* and *Solanum ssp.* were seeded. On the seeds the active ingredients were sprayed in a quantity of 5 kg of active ingredient per hectare, suspended in 600 liters of water per hectare. Then the seeds were covered with earth and set up for germination. The plants germinated after 10 days. Even after 4 weeks, no or no considerable growth damage was noted on the sugar beets treated with the agent according to

| Compound | Sinapis ssp. | Solanum ssp. | Sugar beets |
|---|---|---|---|
| N,N-dimethyl-N'-(4-(N''-phenyl-carbamoyloxy)-phenyl) urea | 0 | 0 | 10 |
| N,N-dimethyl-N'-(4-(N''-(3'-methylphenyl)-carbamoyloxy)-phenyl) urea | 0 | 0 | 10 |
| N,N-dimethyl-N'-(4-(N''-methyl-N''-phenylcarbamoyloxy)-phenyl) urea | 0 | 0 | 8 |
| N,N-dimethyl-N'-(4-(N''-hexyl-carbamoyloxy)-phenyl) urea | 0 | 0 | 10 |
| N,N-dimethyl-N'-(3-(N''-tert. butylcarbamoyloxy)-phenyl) urea | 0 | 0 | 0 |

0 = totally destroyed
10 = no damage the invention, while Sinapis and Solanum were destroyed. The known agent, on the contrary, showed no selectivity for sugar beets.

EXAMPLE 8

Sugar beets (*Beta vulgaris*), cotton (*Gossypium ssp.*), *Sinapis ssp.* and *Solanum ssp.* were treated with the agents referred to after the plants had produced the first foliage leaves and were in the young stage. The quantity used was 5 kg of active ingredient per hectare, suspended in 600 liters of water per hectare. With this treatment in the post-germination process the agents of the invention destroyed only Sinapis and Solanum. The sugar beets and the cotton showed no or only minor impairment of the growth. The known agent, on the contrary, destroyed everything.

EXAMPLE 9

Sugar beets (*Beta vulgaris*), cotton (*Gossypium ssp.*) and *Sinapis ssp.* were treated with the agents referred to after the plants had formed the first foliage leaves and were in the young stage. The quantity used was 5 kg of active ingredient per hectare, suspended in 600 liters of water per hectare. With this treatment in the post-germination process the agents according to the invention destroyed only Sinapis. The sugar beets and the cotton showed no or only minor impairment of the growth. The known agent, on the contrary, destroyed everything.

| Compound | Sinapis | Sugar beets | Cotton |
|---|---|---|---|
| N,N-dimethyl-N'-(4-(N''-(2,4-dimethylphenyl)-carbamoyloxy)-phenyl) urea | 0 | 10 | 10 |
| N,N-dimethyl-N'-(4-(N''-(4'-chlorphenyl)-carbamoyloxy) urea | 1 | 10 | 10 |
| N-ethyl-N'-(4-(N''-phenyl)-carbamoyloxy)-phenyl) urea | 7 | 10 | 10 |
| N-ethyl-N'-(4-(N''-(3'-methyl-phenyl)-carbamoyloxy)-phenyl) urea | 7 | 10 | 10 |
| N-methyl-N'-(4-(N''-(3'-methyl-phenyl)-carbamoyloxy)-phenyl) thiourea | 5 | 10 | 10 |
| N-methyl-N'-(4-(N''-(4'-methyl)-phenyl)-carbamoyloxy)-phenyl) thiourea | 3 | 10 | 10 |
| N-ethyl-N'-(4-(N''-methylphenyl)-carbamoyloxy)-phenyl) urea | 7 | 10 | 10 |
| N-ethyl-N'-(4-(N''-tert.butyl-carbamoyloxy)-phenyl) urea | 7 | 10 | 10 |
| N,N-dimethyl-N' - (3-(N''-tert. butylcarbamoyloxy)-phenyl) urea | 0 | 0 | 0 |

0 = totally destroyed
10 = no damage

From the foregoing description of the invention as exemplified and illustrated, it will be noted that we have provided herbicides containing N-carbamoyloxy-phenylureas either alone or in conjunction with other

| Compound | Sinapis ssp. | Solanum ssp. | Sugar Beets | Cotton |
|---|---|---|---|---|
| N,N-dimethyl-N'-(4-(N''-phenyl)carbamoyloxy)-phenyl) urea | 0 | 0 | 10 | 10 |
| N,N-dimethyl-N'-(4-(N''-(3'-methylphenyl)-carbamoyloxy)-phenyl) urea | 0 | 0 | 10 | 10 |
| N,N-dimethyl-N'-(4-(N''-tert. butylcarbamoyloxy)-phenyl)-urea | 0 | 0 | 8 | 10 |
| N,N-dimethyl-N'-4-allyl-carbamoyloxy)-phenyl) urea | 0 | 0 | 10 | 10 |
| N,N-dimethyl-N'-(4-(N''-ethyl-carbamoyloxy)-phenyl) urea | 0 | 2 | 10 | 10 |
| N,N-dimethyl-N'-(4-(N''-iso-butylcarbamoyloxy)-phenyl)-urea | 2 | 2 | 10 | 10 |
| N,N-dimethyl-N'-(4-(N''-pro-pylcarbamoyloxy)-phenyl) urea | 0 | 0 | 8 | 10 |
| N,N-dimethyl-N'-(4-(N''-butyl-carbamoyloxy)-phenyl) urea | 0 | 0 | 9 | 10 |
| N,N-dimethyl-N'-(4-(N''-p-tolyl-carbamoyloxy)-phenyl) urea | 1 | 1 | 10 | 10 |
| N,N-dimethyl-N'-(4-(N''-methyl-N''-phenylcarbamoyloxy)-phenyl) urea | 0 | 0 | 10 | 10 |
| N,N-dimethyl-N'-(4-(N''-dimethyl propylcarbamoyloxy)-phenyl) urea | 0 | 0 | — | 10 |
| N,N-dimethyl-N'-(4-(N''-hexyl-carbamoyloxy)-phenyl) urea | 0 | 0 | — | 10 |
| N,N-dimethyl-N'-(4-(N''-octyl-carbamoyloxy)-phenyl) urea | 1 | 0 | 10 | 10 |
| N,N-dimethyl-N'-(4-(N''-cyclo-hexylcarbamoyloxy)-phenyl) urea | 0 | 0 | 8 | 10 |
| N,N-dimethyl-N'-(4-(N''-2,3-dimethylphenyl)-carbamoyloxy)urea | 0 | 0 | 10 | 10 |
| N,N-dimethyl-N'-(3(N''-tert. butylcarbamoyloxy)-phenyl) urea | 0 | 0 | 0 | 0 |

0 = totally destroyed
10 = no damage herbicides for synergistic effect which are suitable for weed control in the cultivation of crops.

We claim:

1. N,N-dimethyl-N'-(3-(N''-methyl-N''-(3'-methyphenyl)-carbomoyloxy)-phenyl-urea.

* * * * *